United States Patent [19]
Pang et al.

[11] Patent Number: 5,579,317
[45] Date of Patent: Nov. 26, 1996

[54] PACKET ERROR PROPAGATION FOR MPEG TRANSPORT DEMULTIPLEXERS

[75] Inventors: King-Fai Pang, Mountain View; Darren D. Neuman, San Jose, both of Calif.

[73] Assignee: LSI Logic Corporation, Milpitas, Calif.

[21] Appl. No.: 515,434

[22] Filed: Aug. 15, 1995

[51] Int. Cl.$^6$ .................................................. H04L 12/56
[52] U.S. Cl. ........................................ 370/94.1; 348/423
[58] Field of Search ...................... 370/94.1, 13, 110.1; 348/423

[56] References Cited

U.S. PATENT DOCUMENTS

| | | | |
|---|---|---|---|
| 5,420,866 | 5/1995 | Wasilewski | 370/110.1 |
| 5,442,400 | 8/1995 | Sun et al. | 348/402 |
| 5,457,701 | 10/1995 | Wasilewski et al. | 371/37.1 |
| 5,475,688 | 12/1995 | Bridgewater et al. | 370/94.1 |

*Primary Examiner*—Douglas W. Olms
*Assistant Examiner*—Min Jung
*Attorney, Agent, or Firm*—Townsend & Townsend and Crew LLP; Henry K. Woodward

[57] ABSTRACT

In an MPEG audio and video signal transmission system in which audio and video signals are encoded in packets which are multiplexed to form a stream for transmission, a receiver system includes a demultiplexer to separate audio and video packets. The header for each packet is parsed, and an error propagation header is inserted with each packet to identify byte count of the packet and an error flag. In a preferred embodiment the error propagation header includes a first byte representing the total byte count and a single bit in a second byte as the error flag. The error propagation header allows errors to be accurately located even in the presence of variable delay introduced by buffers.

8 Claims, 1 Drawing Sheet

PACKET ERROR PROPAGATION FOR MPEG TRANSPORT DEMULTIPLEXERS

BACKGROUND OF THE INVENTION

This invention relates generally to the coding and decoding of motion picture signals and associated audio signals, and more particularly the invention relates to the detection of errors and the propagation of an error indicator in a decoder system for transmitted motion and audio signals.

MPEG is a standard which has been established for the transmission of motion picture signals and associated audio signals. Coding of the signals can be in a program stream or in a transport stream which combines one or more program streams. Video and audio signals are each encoded into separate elementary streams which are packetized to produce PES (packetized elementary stream) packets which are multiplexed in the program and transport stream. Each packet has a header followed by 188 bytes of payload.

The transmitted program and transport streams are received by a system decoder and demultiplexer which separates the audio and video signal packets. These packets are then applied in parallel to respective audio and video decoders as elementary PES packets.

Error conditions in the received transport streams are detected at the front end of the decoder and demultiplexer where packet headers are parsed. However, there is no mechanism for propagating a detected error condition to the decoders of the elementary streams of audio and video packets.

SUMMARY OF THE INVENTION

In accordance with the invention, an error propagation header is inserted in a packet during the packet header parsing stage. The header flows through the receiver system to the backend decoders. Prior to the output of the elementary stream, the error propagation header is parsed after alerting the elementary stream decoder of an error and also when to expect the next error propagation header.

In a preferred embodiment, the error propagation header comprises two bytes with the first byte containing a count of the number of payload bytes in the associated packet. The second byte of the header contains a one bit flag indicating if an error has occurred in the packet. This flag allows an error to be raised to the downstream decoder, while the byte count allows the decoder to ascertain when to expect the next error propagation header.

The invention and objects and features thereof will be more readily apparent from the following detailed description and appended claims when taken with the drawing.

DESCRIPTION OF THE PREFERRED EMBODIMENT

Figure 1:
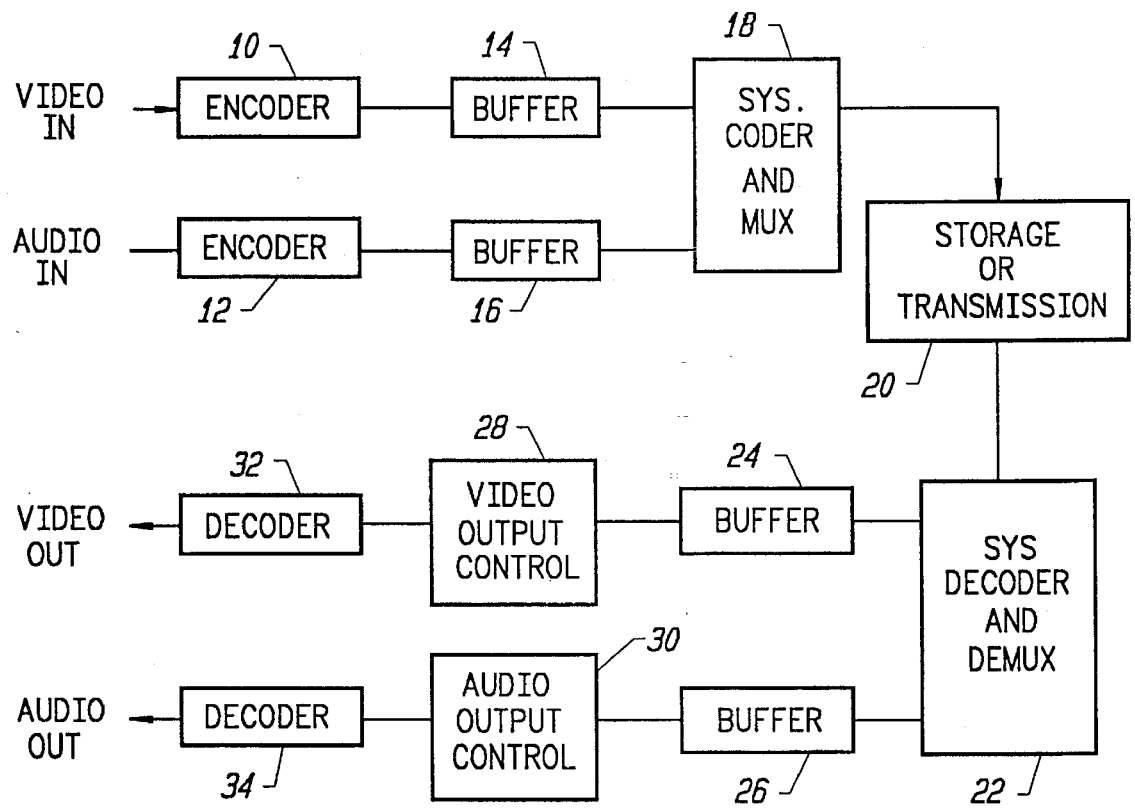
FIG. 1 is a functional block diagram of a motion picture and audio transmission system in accordance with the MPEG standard.

FIG. 1 is a functional block diagram of a motion picture and audio transmission system in accordance with the MPEG standard. Video data and audio data are respectively encoded at 10 and 12 to form elementary streams which are packetized to produce PES packets. The streams of PES packets are then passed through buffers 14, 16 to a system coder and multiplexer 18 which combines one or more streams of PES packets in a multiplexed program or transport stream for storage or transmission at 20.

The multiplex transport stream is received by a system decoder and demultiplexer 22 which separates the PES packets and forms compressed elementary streams of audio and video data. Elementary streams or PES packets are then passed through buffers 24, 26, video output control 28 and audio output control 30, to decoders 32, 34 which produce the elementary streams or PES packets of audio and video signals.

As noted above, error conditions are detected by the system decoder and demultiplexer at the front end of the decoder. The error conditions can be detected in a variety of ways including being passed from a channel decoder upstream, an error indicator in a packet header, a discontinuity counter mismatch, or by a discontinuity indicator. The detection of error conditions occurs at the front end of the receiver where packet headers are parsed. Heretofore, no mechanism was provided for propagating detected errors through the receiver system to the video and audio decoders.

Figure 2:
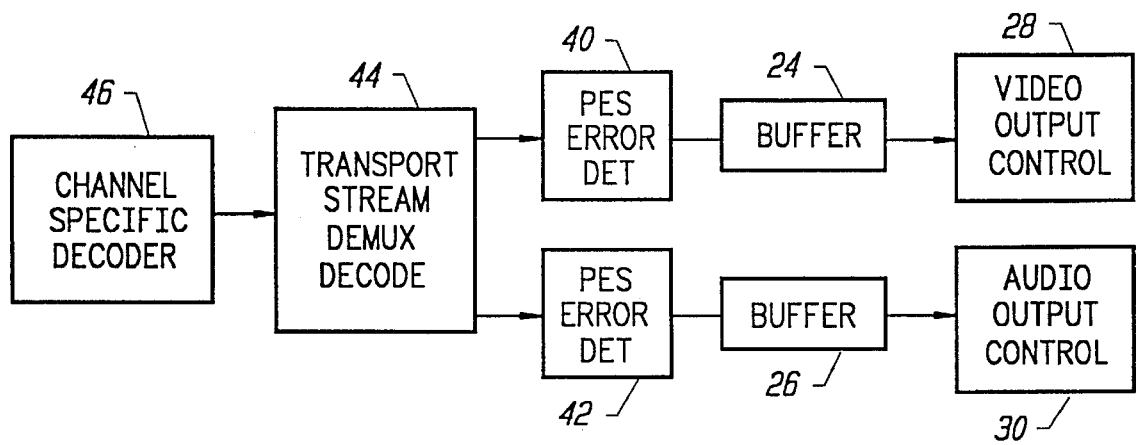
FIG. 2 is a functional block diagram of the receiver system of FIG. 1 and including means for inserting an error propagation header in accordance with the invention.

FIG. 2 is a functional block diagram of the receiver system of FIG. 1 and including PES error detectors 40, 42 associated with a transport stream demux and decode unit 44. The transport stream demux and decode unit 44 receives a channel transport stream from channel specific decoder 46, and the separated audio and video elementary stream packets are passed to the error detectors 40, 42 for identification of errors in the PES packets. The detectors 40, 42 insert with each packet, after the packet header parsing, an error propagation header which is passed with the packets through buffers 24, 26 to the video and audio output controllers 28, 30 to alert the decoders to the presence of an error and when to expect the next error propagation header. The buffers can be on chip or a semiconductor off chip memory such as a DRAM or an SRAM; thus, variable delay may occur from the front end to the decode outputs. However, the error propagation headers allow errors to be accurately located despite variable delay of the buffers.

Figure 3:
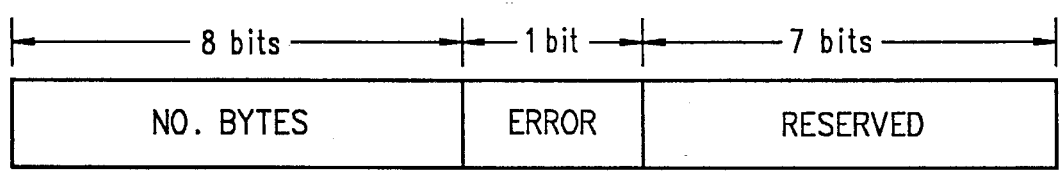
FIG. 3 is a representation of an error propagation header in accordance with a preferred embodiment of the invention.

FIG. 3 is a representation of an error propagation header in accordance with a preferred embodiment. The header includes two bytes with the first byte (8 bits) containing a count of the number of bytes of payload in the associated packet. The second byte of the header contains a one bit flag indicating if an error has occurred. At the back end, prior to the output of elementary streams, the two byte header is parsed, and the error flag allows an error interrupt to be raised to the source decoder.

The use of an error propagation in association with a PES packet allows an identified error at the front end of a receiver to be communicated to the decoders at the backend of the receiver system. The use of two bytes according to the preferred embodiment permits easy construction in the use of a minimal number of extra bits to achieve both an error flag and an indication as to when the next error propagation header can be expected. While the invention has been described with reference to a specific embodiment, the description is illustrative of the invention and is not to be construed to be limiting the invention. For example, in the preferred embodiment buffers are provided between the front end and the back end of the transport decoder, but the invention can be used to identify the error propagation independent of the use or type of buffers. Various modifications and applications may occur to those skilled in the art without departing from the true spirit and scope of the invention as defined by the appended claims.

What is claimed is:

1. In an audio and video signal transmission system in which audio and video signals are encoded in packets which are multiplexed to form a stream for transmission, a method of decoding the transmitted signals comprising the steps of a) demultiplexing a received stream to separate audio and video packets,
   b) identifying the presence of any error in each packet,
   c) parsing a packet header received with each packet, and
   d) inserting an error propagation header with each packet to signal the presence of an error, said error propagation header identifying byte count of an associated packet and an error flag.

2. The method of decoding as defined by claim 1 wherein said error propagation header includes a first byte for indicating byte count in said packet and a second byte for indicating the presence of an error.

3. The method of decoding as defined by claim 2 wherein said second byte includes one bit which indicates the presence of an error.

4. In an audio and video signal transmission system in which audio and video signals are encoded in packets which are multiplexed to form a stream for transmission, a receiver system comprising a) means for demultiplexing a received stream to separate audio and video packets,
   b) means for identifying the presence of any error in each packet,
   c) means for inserting an error propagation header with each packet to signal the presence of an error, said error propagation header identifying byte count of an associated packet and an error flag,
   d) means for parsing a packet header and generating an error signal to notify video and audio decoders, and
   e) buffer means introducing variable delay, the error propagation header allowing errors to be accurately identified in the presence of delay.

5. The receiver system as defined by claim 4 wherein said error propagation header includes a first byte for indicating byte count in said packet and a second byte for indicating the presence of an error.

6. The receiver system as defined by claim 5 wherein said second byte includes one bit which indicates the presence of an error.

7. The receiver system as defined by claim 4 wherein said buffer means comprise semiconductor memory buffers.

8. The receiver system as defined by claim 7 wherein said semiconductor memory is selected from the group consisting of SRAM and DRAM devices.

\* \* \* \* \*